July 8, 1969  B. A. GRUBER  3,454,430
TAPE FEED FOR TAPE FUEL CELL AND THE METHOD
OF OPERATING A DRY TAPE FUEL CELL Filed March 29, 1966

INVENTOR
BERNARD A. GRUBER

BY Lorna A. Ferris

ATTORNEY

July 8, 1969   B. A. GRUBER   3,454,430
TAPE FEED FOR TAPE FUEL CELL AND THE METHOD
OF OPERATING A DRY TAPE FUEL CELL
Filed March 29, 1966   Sheet 2 of 2

INVENTOR.
BERNARD A. GRUBER
BY Lorne A. Ferris
ATTORNEY

United States Patent Office 3,454,430
Patented July 8, 1969

3,454,430
TAPE FEED FOR TAPE FUEL CELL AND THE METHOD OF OPERATING A DRY TAPE FUEL CELL
Bernard A. Gruber, Boxford, Mass., assignor to Monsanto Research Corporation, St. Louis, Mo., a corporation of Delaware
Continuation-in-part of application Ser. No. 232,144, Oct. 22, 1962. This application Mar. 29, 1966, Ser. No. 538,377
The portion of the term of the patent subsequent to July 12, 1983, has been disclaimed
Int. Cl. H01m 27/12
U.S. Cl. 136—86   15 Claims This application is a continuation-in-part of my copending application S.N. 232,144, filed Oct. 22, 1962, now U.S. Patent No. 3,260,620.

This invention relates to fuel cells, and more particularly, provides a novel separator tape feed for a tape fuel cell and a novel method of operating such a cell with a tape feed.

By a fuel cell is meant a device for electrochemical generation of electricity which is provided with a continuous supply of the chemicals by the reaction of which the electricity is generated, and means to remove the products of reaction. A flashlight battery lasts no longer than its self-contained supply of the electrochemical reagents. An automobile battery depends on frequent periodic charging by a mechanical generator for prolonging its life. The theory of a fuel cell is that the cell will continue to deliver electricity for so long as the reactants are supplied to the cell and reaction products removed so as to maintain a substantially invariant system.

In practice, it has been found difficult to realize this ideal. One factor presenting particular difficulty in effective cell design is the separator between the cell electrodes.

Use of stationary ion exchange membranes as the separators in fuel cells is often not entirely satisfactory. Their life is short, where active, strong chemical reagents are used as fuel cell materials.

Another item causing difficulty in fuel cell operation is polarization. This a phenomenon which may be described as departure from thermodynamic ideality. It reduces the difference in potential between the two electrodes when current is flowing, reducing the amount of power the cell can generate. Thus the open circuit voltage of a cell may be high, but the drop in this potential difference when a load is applied by connection to an external circuit immediately reduces the voltage developed. Further polarization is observed as the cell is operated. The polarization increases as the current drain increases, so that at high loads, a cell may very quickly become too far polarized to deliver any substantial amount of power.

Still another difficulty sometimes of concern in fuel cell technology is design of conveniently transportable units. Gases, such as used in the hydrogen/oxygen cell, require heavy, bulky equipment for their transport and storage. Liquids are more convenient to use, but also can present problems. The possibility of spillage must be considered in design of portable cells. Gravity feed cannot be depended on when the cell may be tipped while being operated, or in environments where the cell must operate independently of gravity, in space capsules or the like.

It is an object of this invention to provide an improved method of operation of fuel cell.

A particular object of this invention is to provide a novel separator tape feed for a tape fuel cell.

These and still other objects will become apparent from the following description, considered in conjunction with the drawings in which FIGURE 1 is a diagrammatic horizontal section of a tape separator construction provided in accordance with the invention;

Figure 1:
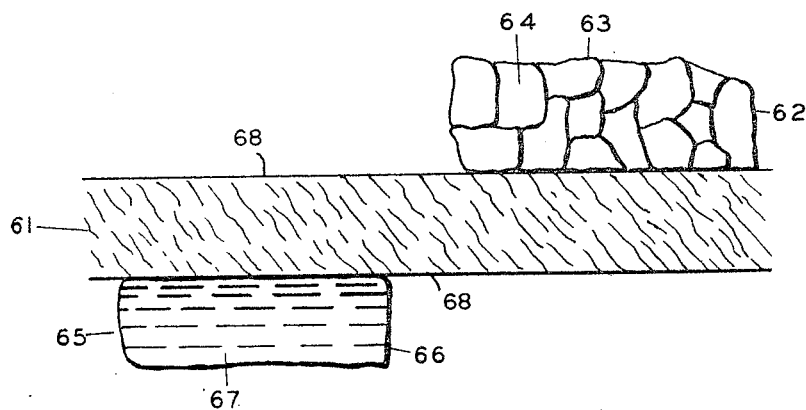

In accordance with this invention, there is provided a dry tape separator of electrolytically permeable material, coated with at least one electrochemical reaction component, the said tape carrying a fluid electrochemical fuel cell component, encapsulated in rupturable capsules.

In a preferred embodiment, there is provided an encased electrochemical system comprising a dry tape separator of electrolytically permeable material, coated with at least one electrochemical reaction component and including a fluid electrochemical fuel cell component encapsulated in rupturable capsules, enclosed in a flexible fluid-impermeable casing.

Also provided by this invention is a novel method of operating a dry tape fuel cell, comprising advancing an encased electrochemical system comprising a dry tape separator of electrolytically permeable material, coated with at least one electrochemical reaction component and carrying a fluid electrochemical reaction component encapsulated in rupturable capsules, enclosed in a flexible, fluid-impermeable casing, to active electrode sites, and rupturing the capsules as the tape is fed to the active electrode sites.

The stated novel product and method are particularly adapted to operation in a cell in which the electrolytic connection between the current collectors is made through a separator which moves past the active electrode sites, as described and claimed in my above-identified copending application.

What is meant by the active electrode site is the site of the introduction or withdrawal of electrons to or from the electrolyte. The term electrode is sometimes given this restrictive meaning, but is generally used to designate, broadly, a device for the accomplishment of this result. Most of the electrode, in this broader sense of the term, is a current collector, with the function of conducting electrons to or from the site of their exchange with the electrolyte.

In the fuel cells employing moving separators, the functions of current collector and producing exchange of electrons with the electrolyte may require distinction, in some cases. For the purposes of discussion, the portion of the electrode actively participating in the electron/electrolyte exchange may be identified as the active electrode, and the remainder of the conductive material, as passive electrode. The active electrode material may actually be carried to the site of the electrochemical reaction by the separator, as will be seen from the following discussion, whereby it becomes the active electrode when the separator provides the electrolytic path between the current collectors.

Fuel cells are inherently dynamic systems, which necessarily provide for the inflow and outgo of reactants and products. Yet designs for them have ordinarilly taken the static approach of the closed systems of conventional Le Clanché cells and the like. The electrode separator of a fuel cell is a part which has conventionally been designed for static operation. By provision of a separator which moves past the active electrode sites in a fuel cell, it is found that a variety of considerable advantages can be gained.

Dry tape carriers of fuel cell reactants offer still further advantages. In this embodiment of the present invention, the tape separator carries one or more components of the fuel cell to the electrochemical reaction site in the form of a coating on the tape. The presence of free liquid can be completely eliminated, to achieve the advantages of a dry cell, which operates independently of gravity or of the position of the cell.

Thus, fluid materials can be applied to the tape separator as rupturable capsules. These may, for example, be what may be termed macrocapsules. If two tapes are sealed together around the periphery of defined areas, the space between can be a liquid trap. For example, the two tapes can be sealed down the sides and sealed across in stripes at intervals down their lengths. The open spaces between the sealed parts can then serve as liquid containers. The tape can be cycled past sharp points or the like which rupture the capsules before they get to the electrodes. Two such tapes, or a coating on either side of one tape, can supply the anode and the cathode feeds respectively.

Macroencapsulated fluid components can also be provided on the tape by having the tape include or carry rupturable capsules containing fluids enclosed in flexible polymer walls. For example, capsules carried on the tape may contain an electrolyte solvent such as water, which is released by crushing the flexible capsules.

Conveniently, in a more sophisticated system, the electrochemical reaction components can be coated on the tape in the form of pressure-rupturable microcapsules. Encapsulation techniques produce minute droplets of liquid encased in a coating of film-forming materials such as polymers, which can be applied to a substrate such as paper to produce an adherent coating thereon. Various electrochemical systems have been devised in which a single liquid can serve the function of fuel and electrolyte, and another single liquid can serve the function of oxidant and electrolyte. For example, the fuel-electrolyte solution may be an aqueous solution of methanol as the fuel and potassium hydroxide as the electrolyte. The oxidant-electrolyte liquid feed may be an aqueous solution of hydrogen peroxide. Thus fluid fuel-electrolyte and oxidant-electrolyte systems can be encapsulated and applied to opposite sides of a porous tape separator. Passage of the tape between closely spaced electrodes can exert sufficient pressure on it to rupture the capsules and thus release the reactants, as well as electrolyte.

Not only may the electrolyte, fuel and oxidant components of a fuel cell system be supplied to the electrodes by a moving tape system, but indeed, what may be regarded as the electrode itself may be provided by the tape.

A magnesium coating may readily be applied to one side of a separator tape, producing a laminated tape on which the magnesium is supplied as fuel to the electrochemical site. The other side of the tape may also be provided with a dry coating of oxidant-electrolyte solution enclosed in rupturable capsules, as discussed above.

When a laminate of the stated nature is used, the device at the anode site in the cell need be no more than a current collector. For example, it can be simply an electrically conductive contact, made of carbon, copper or the like, able to pick up and conduct away the electrons as they are released by solution of the metal in the electrolyte.

Similarly, a cathodic current collector, made of conductive materials as described such as carbon, may be used in conjunction with a tape carrying an active cathode material such as silver (II) oxide, wet for example with aqueous KOH as electrolyte. If desired, this tape may be laminated to a coating of zinc on the reverse side, to act as an active anodic material, whereby the device at the anode site may also be merely a current collector as above described.

An active anode material such as a metal like magnesium or zinc, and an active cathode material such as silver (II) oxide, function respectively as a fuel and as an oxidant, as well as functioning as active electrode materials. They are thus consumable electrode materials.

The tape carrier approach is not limited to consumable electrodes, either. While cathode and anode materials such as carbon and noble metals may be referred to as "inert," the nature of the electrode is recognized to have a definite, pronounced effect on the facility with which electrochemical reactions proceed. Factors involved in this may include catalytic activity of the electrode material in promoting the electrochemical reaction, effect of porosity in providing reaction sites and so forth. One of the factors involved in polarization of electrode (decline in potential developed by the cell) seems to be an effect of saturation of active sites.

As discussed above, a significant factor in preventing optimum performance of fuel cells is polarization of the electrodes. The polarization can be shown to be made up of several different components, one of which is concentration polarization. Concentration polarization produces mass transfer limitations on the performance of the electrodes. A finite amount of time is required for the reactants to reach active sites at the electrode where they can undergo the electrochemical reaction (oxidation or reduction) and to be removed from such active sites, leaving the sites available for further reactant to occupy them.

Active electrode materials such as platinum can be applied to tapes in very thin coatings by methods such as sputtering. Oxidants and fuels can be mixed with an active electrode material such as conductive carbon black. The tape can thus carry a continuously fresh electrode surface to the electrochemical reaction sites. As a result, the limits on the rate at which an electrode can deliver current by lack of sufficiently rapidly available reaction sites can be avoided. Again, here, the device at the reaction site can be merely a current collector, with the tape carrying the active electrode surface to it.

Indeed, as will be readily evident from the foregoing, the moving separator tape can advantageously carry every active component of the fuel cell, including fuel, oxidant, electrolyte fluid and on top of this, the active electrode surfaces (including catalysts), all in one package.

A complete electrochemical system comprising a tape separator as provided by this invention, carrying a fluid electrochemical reaction component in rupturable capsules and carrying fuel, oxidant, electrolyte and active electrode materials, is advantageously packaged, by encasing it in a flexible, fluid-impermeable casing.

This provides an encased electrochemical system which can be advanced to active electrode sites at current collectors with rupture of the capsules as the tape is advanced, while the fluid released is kept from contact with the current collectors or the surrounding environment. The flexibility of the casing permits transfer of pressure to the capsules to rupture them, while the released fluid is retained in a fluid-impermeable envelope.

Presence of the fluid-impermeable casing keeps released fluid from volatilizing in low pressure atmospheres. It permits the used of a toxic gas such as fluorine without need of enclosing or venting the cell. It protects the current collectors from being attacked by corrosive fluids such as strongly basic or acidic electrolytes. It provides an effectively dry used tape waste output from the cell, obviating used tape storage corrosion problems.

The flexibility of the casing also permits retention of advantageous properties of a tape feed for a fuel cell, such as compact storage of the tape cell feed and waste, with the tape rolled or folded into a small space, and continuous supply of the feed to the cell.

Moreover, the encased tape feed can be divided into segments by fluid-impermeable seals across the casing, thus providing a continuous but segmented tape feed. As fluid is released from capsules carried by the tape, it can seep back along the tape separator, activating exposed reactants which have not yet reached the current collectors. Many electrochemical reactants will undergo chemical reaction with an electrolyte, and thus be consumed before reaching the current collectors. This seepage can be controlled by segmenting the casing with fluid-impermeable seals, whereby access of fluid released from a capsule in the casing is limited to the tape in the segment between the seals.

The novel method of operating a fuel cell provided by this invention comprises different modes of procedure, wherein an encased tape separator carrying an electrochemical system is advanced to active electrode sites.

The above-described novel encased tape system can be used to feed the cell. The casing will contain an elongated tape separator carrying a series of rupturable capsules along the length of the tape, and substantially longer than the active electrode sites. Thus the encased system will be adapted to provide a continuous, connected feed to the cell. As the encased tape is advanced, the capsules along its length will be successively ruptured, activating successive portions of the tape by release of the fluid they contain.

The above-described segmented encased tape system can also be employed to feed a cell in accordance with the novel method of this invention.

In still another embodiment of the method of this invention, the feed can be a series of individually encased short tape segments carrying a fluid electrochemical reactant in rupturable capsules. The encapsulated fluid in these individually encased segment systems will be sufficient to activate the individually encased segments; it may be encapsulated in one capsule, or more than one.

In sequential advancement of the individually encased segments, the tape separator segments will be moved past the active electrode sites at the current collectors. Like a continuous tape, such individually encased segments can be advanced between current collectors at the rate required to produce a substantially invariant power output during current drain.

While discussions of the novel tapes, encased tape systems and methods of operating a cell above have referred to a single tape, this invention is not limited thereto. The tapes carrying complete electrochemical systems, particularly those enclosed in a casing, can be stacked up or folded over to provide multiple anode, cathode, or anode and cathode surfaces which, with appropriate connection from one to the next, increase the amperage or voltage from a given length of the tape.

Referring now in further detail to the embodiments of the invention illustrated in the drawings, FIGURE 1 is a horizontal diagrammatic section view of a tape which may be employed in accordance with the invention for a dry tape feed. In this tape, 61 is the base, permeable to electrolyte, made of a bibulous material such as paper or the like. Adhered to the base 61 is a closed cell foam 62. In this foam 62, cells are defined by walls 63, which completely enclose interior spaces 64 which are filled with an electrochemically active gas such as fluorine. The closed cell foamed polymeric coating on the tape may be formed, for example, by blowing fluorine into an inert polymer such as polyethylene, at a temperature sufficient to soften it, and then cooling to harden. The layer 65 on the other side of the tape base 61 is a series of rupturable capsules enclosed by walls 66 made of solid polymeric material such as polyethylene, for example, enclosing fluid electrolyte 67. Portions 68 of the tape base 61 are left uncoated, which will be available to access of the contents of layers 62 and 65 upon their rupture.

Figure 2:
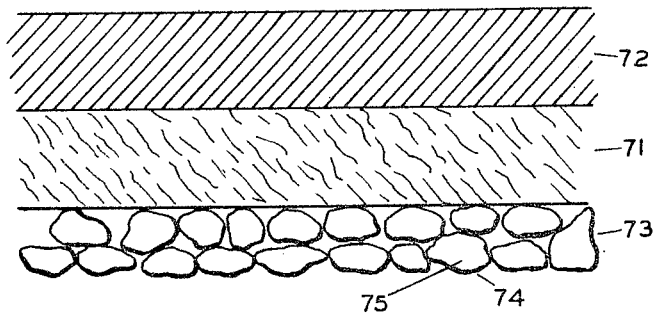
FIGURE 2 is a diagrammatic vertical section of another embodiment of a dry tape separator for a fuel cell in accordance with the invention.

FIGURE 2 shows a vertical diagrammatic section view of another such tape, in which 71 is a bibulous base material such as paper coated with a consumable anode material such as a sputtered magnesium coating 72. A layer of capsules 73 is adhered to the opposite surface of the tape. The outer capsule surface 74 may be made of a flexible, rupturable material such as polyvinyl chloride. The space 75 inside the capsules contains a fluid oxidant-electrolyte solution such as aqueous suspension of dinitrobenzene. Puncturing or crushing the frangible capsules releases the oxidant-electrolyte solution to wet the surface of the paper tape 71.

Figure 3:
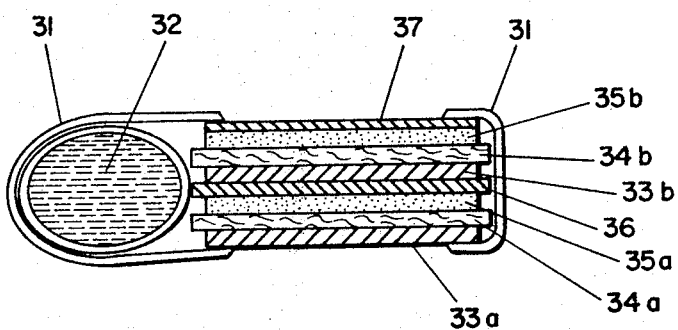
FIGURE 3 is a diagrammatic horizontal section of still another embodiment of a dry tape separator construction provided in accordance with the invention.

FIGURE 3 is a diagrammatic vertical section view of another such tape, in which 31 is a casing of a fluid-impermeable material such as polyethylene. The casing 31 encloses a rupturable capsule 32 containing electrolyte solvent such as water. 33a and 33b are foils of consumable anode metal such as zinc, and 34a and 34b are bibulous tape base separator materials such as paper. 35a and 35b are coatings of electrolyte and oxidant material, such as a mixture of KOH, manganese dioxide and conductive carbon, and 36 is a conductive metal foil, such as a steel foil. The illustrated stacked tapes with the conductive foil 36 connecting them provide twice the amperage of a single tape; more than two such tapes can be stacked, or the encased electrochemical system can comprise a single tape. 37 is a conductive surface, such as a foil of a metal like steel. The casing 31 is adhered, by heat-sealing or the like, to the conductive surface 37 and the anode metal 33a, so that electrolyte released from capsule 32 to wet the separators 34a and 34b and activate the system cannot escape from the package.

If the released electrolyte will corrode the anode metal and eventually eat through it, if desired a foil of conductive and non-corroding material such as stainless steel can be included below the anode metal, adhered to or forming part of the casing, to prevent leakage from the package.

Figure 4:
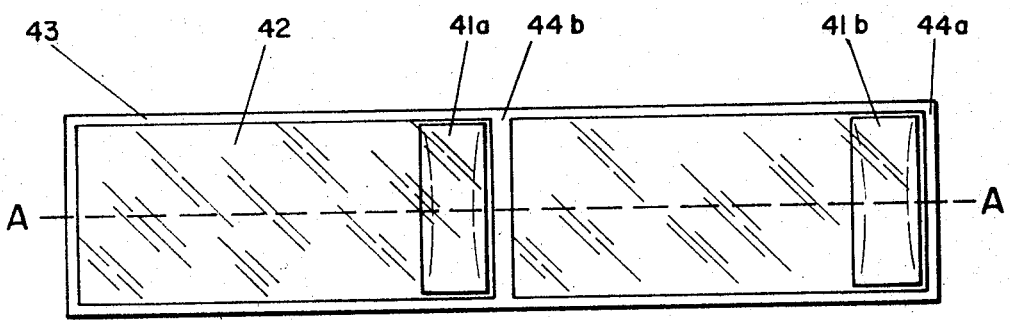
FIGURE 4 is a top plan view of a dry tape separator construction provided in accordance with the invention.

FIGURE 4 is a top plan view of an encased electrochemical system in which 41a and 41b are rupturable capsules of electrolyte solvent carried by the tape and 42 is an electrically conductive surface of the casing. The casing nonconductive edge 43 may be integral with this surface 42 or sealed to it as illustrated in FIGURE 3. Seals 44a and 44b across the casing, produced by heat sealing for example, divide the tape into segments, activated by rupture of the capsule in the segment to wet the tape. A section of this encased tape along line A—A is illustrated in FIGURE 5.

Figure 5:
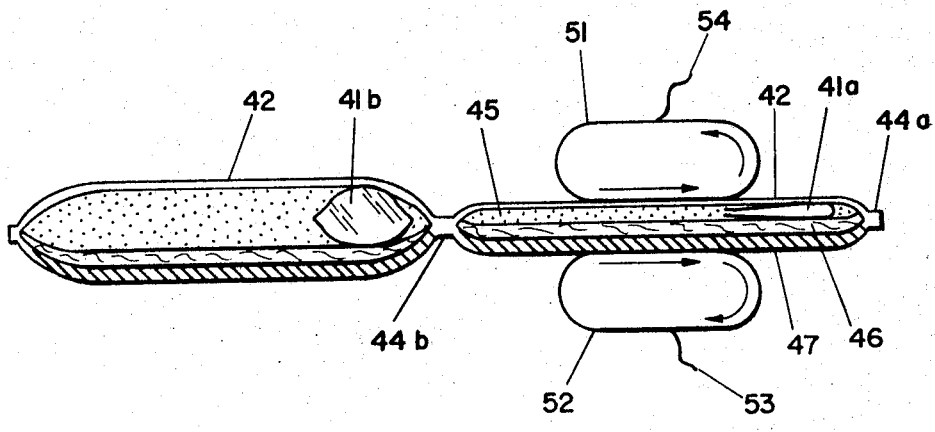
FIGURE 5 is a diagrammatic cross-sectional view of a dry tape separator construction moving between current collectors.

FIGURE 5 is a diagrammatic horizontal section view of an encased tape system in a cell containing current collectors 51 and 52 with leads 53 and 54 to an external circuit. The current collectors 51 and 52 are elliptical bands, which rotate as indicated by the arrows inside them. Current collector 51 contacts the conductive surface 42 of the casing, which covers an oxidant coating 45 on a bibulous tape base 46. A foil 47 of anode metal such as zinc underlies the tape base 46, and contacts current collector 52. Passage of the tape in the direction shown by the arrow ruptures capsule 41a, by compression of the tape between the current collectors, and releases the encapsulated electrolyte fluid. The tape segment from seal 44a to seal 44b is activated by release of the fluid, but the seal 44b prevents wetting of the separator in the next segment until it in turn is moved between the current collectors and crushing ruptures the capsule in it.

The cells in which the tapes of this invention are used can be operated manually, by pulling tapes through the current collectors, or may have a drive such as a key wound spring or a parasitic drive. A fraction of the power supplied by the tape may be used to power an electric motor moving the tape, for parasitic drive operation.

The tape will be advanced in the cells at a rate providing a substantially invariant power output during operation of the cells.

Materials which can be used as the tape separator material include cellulosic materials, which may be matted or felted sheets of cellulosic fiber such as paper. Papers produced from pulps made by mechanical pulping or by chemical methods or by a combination of the two can be employed, and it may be bleached or unleached. The sulfite pulp papers made from wood and waste paper are representative of such materials, the cellulosic materials in the resulting papers generally consisting primarily of α-cellulose. Other cellulose materials and derivatives may also be employed as the tape base. For example, cellulose esters such as cellulose acetate, cellulose acetate propionate and cellulose acetate butyrate, and cellulose ethers such as ethyl cellulose can be formed into films useful as the tape base. The tapes may also be made of semipermeable, substantially homogeneous organic sheet material comprising regenerated cellulose. For example, this may be cellophane, which is a regenerated cellulose formed by coagulating an aqueous solution of sodium hydroxide and viscose (aged cellulose xanthate), in a bath of sodium acid sulfate. Cellulose can also be regenerated from cellulose acetate by saponification to provide materials which are highly wettable as well as resistant to chemical attack. The tape base may also comprise hydrophilic cellulosic derivatives such as methyl cellulose, carboxymethyl cellulose, hydroxyethyl cellulose, and the like, particularly as coatings or impregnants, for example, of alpha cellulose fibers.

It is found that a permeable non-woven material, and particularly, a non-woven fibrous fabric material is an especially advantageous material for the tape base. While a woven fabric base has an irregular surface, preventing complete physical contact with flat electrode plates, and generally has a sufficiently open weave to permit particles to penetrate through it, non-woven materials can be obtained with flat, quite smooth surfaces, coupled with substantial permeability to liquids, without having large enough holes in their structures to permit particles to fall through. For example, such non-woven fibrous fabric materials can be obtained by compressing and heating a mat of polymeric fibers; while an adhesive, such as polyvinyl alcohol, for example, may be used as a binder in preparing such fibrous fabrics, particularly with thermoplastic fiber materials, the use of a binder is not necessary. In general, such non-woven fibrous fabric materials are free of the direct open void spaces extending from face to face which are characteristic of woven fabrics, and yet have substantial permeability to liquids. Permeable materials such as porous plastic films may also be used as tape bases, but at the small pore size preventing penetration by particles, these generally do not permit sufficiently thorough penetration by the electrolyte, resulting in limiting the cell to low discharge rates. On the other hand, non-woven fibrous fabric materials provide an advantageously suitable intermediate permeability, coupled with a smooth surface face, permitting penetration by liquid electrolyte while limiting penetration by particles.

The base is desirably a material resistant to attack by the electrolyte employed in the cell. Strong alkali solutions attack cellulosic materials, and accordingly, a preferred material for the tape base may be one inert to the action of aqueous alkali, such as an inert synthetic polymer, and particularly, a fiber-forming alkali-resistant synthetic polymer. A variety of alkali-resistant film- and fiber-forming polymeric materials are known which may be used in this connection, including for example a nylon (polyhexamethylene adipamide, polycaprolactam, polyhexamethylene sebacamide or the like), a hydrocarbon polymer such as polypropylene, an ester such as polyethylene terephthalate, a nitrile polymer such as polyacrylonitrile, and so forth.

The materials resistant to alkali attack, such as nylon and polypropylene, are also generally more resistant to oxidation than the cellulosics. As is known, cellulosics like paper can be attacked by strongly basic or acidic reactants which leads to loss of the active material during coatings, and weakens the base material.

It may sometimes be advantageous to employ, as a substrate, various other materials in the preparation of the base of the tape. The base may thus, if desired, comprise felts of fibers resistant to heat and to chemicals such as silicon carbide and asbestos, glass or the like. Woven constructions, comprising cloth such as woven cotton, rayon, wool, and synthetic fibers such as the acrylic polymer fibers can also be used.

The tape base can also be an ion exchange membrane, comprising as the active species a synthetic resin provided with functional groups, which are acid groups for cationic permeability and hydroxy groups for anionic permeability.

In references to a tape herein, what is meant is a structure having two dimensions which are very large in relation to the third dimension, such as a sheet, the width and length of which are very much greater than the thickness. The width of the tape, furthermore, is usually desirably small in relation to its length.

Coatings may be provided on the web forming the base of the separator base. These coatings may comprise, for example, materials which promote rapid wetting of the base by aqueous electrolyte solutions. For example, they may comprise the hydrophilic cellulose derivatives mentioned above, such as carboxymethyl cellulose, hydroxyethyl cellulose, and the like. The inclusion of surface active agents may be advantageous. Thus for example, the tape may carry a coating including an anionic surface active agent such as an alkyl aryl sulfonate like dodecylbenzenesulfonate sodium salt, or a sulfated alcohol such as lauryl sodium sulfate.

Coatings carried by the tape base will further include one or more fuel cell reaction components.

The weight of reactants applied per area of tape surface will vary depending on the intended current drain. Surprisingly small amounts are needed. For example, using a one-inch width tape, five amperes can be generated with a tape draw rate of 1 inch per minute by a layer of magnesium only .0024 centimeter thick. With the same rate of draw and current drain, the weight of hydrazine consumed will be only .0249 gram per inch; the weight of nitric acid consumed will be only .0391 gram per inch, and so forth.

Metallic coatings may be applied to the base by a variety of methods, to provide a consumable anode material. A base may be sputter-coated with a metal like magnesium or zinc, or it may be laminated to a metal foil such as aluminum foil, using hide glue, ethyl cellulose, or like adhesives. Metallic coatings on the tape may also comprise active electrode materials such as platinum, palladium, or the like, applied by means such as those above mentioned.

Coatings on the tape may also comprise dry solid electrochemical reaction components other than the consumable anode metals, such as powdered fuels, oxidants and electrolytes, and active electrode materials such as conductive carbon black, which are solid at room temperature. The tape coating may also include fibers, such as graphite fibers, to improve cohesion of the coatings. Exemplary of such electrolytes are, for example, sodium hydroxide, potassium hydroxide, ammonium bromide, magnesium bromide, sodium sulfate, and the like. Illustrative of the dry solid fuels are organic materials such as urea, glucose, and the like. There are a large number of oxidant materials which are available as dry solids at room temperature, exemplary of which are solid inorganic oxidants such as sodium peroxide, manganese dioxide, vanadium pentoxide, sodium chromate, sodium perborate, lithium perchlorate, potassium persulfate, sodium permanganate, and the like, and dry solid organic oxidants such as m-dinitrobenzene and so forth. Application of such dry powders to a tape base can conveniently be effected by means conventional in the art for coating paper, such as mixing the dry solid with an adhesive solution and applying it to the paper base surface. The adhesive employed, for example, may conveniently be a starch solution (prepared by solubilizing the starch with an acid, heat or enzyme treatment), optionally mixed with a humectant such as glycerine, or it may be a synthetic water-soluble binder such as polyvinyl alcohol, polyvinyl formate, carboxymethyl cellulose, polyvinylpyrrolidone or the like.

Liquid or gaseous fuel cell reaction components carried by the dry tape will be enclosed in cell (capsule) walls, with the walls being formed of polymeric material. Methods of adhering polymeric materials to bases such as paper tapes are readily available. For example, adhesives may be used or the polymeric material may be contacted with the paper while it is fluidized by being heated above its melting point or wet with a solvent or fluid swelling agent. Polymers which may be used to form the walls of the capsules enclosing the fluid carried by the tape may comprise, for example, flexible thermoplastics such as polyvinyl chloride, polyethylene, polymers of tetrafluoro- and chlorotrifluoroethylene, polyvinyl acetate, and so forth, or a film-forming polymeric material of natural origin which is a hydrophilic colloid such as gum arabic, gelatin or the like. Means employed to produce enclosure of fluids in a closed cell plastic wall can be, for example, forming a tube of the polymeric material, into the hollow center of which the fluid is loaded; bubbling gas into or dispersing a liquid into a fluid melt of the polymer, or the like. Microcapsules of liquid are conveniently produced by suspending the liquid in a fluid medium with which it is immiscible, and in which a film forming material is dissolved. Thus for example, dinitrobenzene may be dispersed in water containing dissolved hydrophilic colloids such as gum arabic and gelatin. The immiscible liquid is agitated in the fluid medium to form tiny droplets coated by the fluid medium, and then the film-forming materials is caused to solidify, producing enclosure of the liquid in walls of the solidified, filming-forming polymer. Colloids such as gum arabic and gelatin are coacervated by means such as changing the temperature of pH of the medium. The resulting suspension of encapsulated liquid can then be coated onto a surface such as paper, to which it will adhere on drying, forming a coating of pressure-rupturable, fluid-containing capsules.

Polymeric coatings may also be provided on solid reactants adhered to the tape surface, using for example a water soluble polymer like polyvinyl alcohol to adhere a powder to the tape surface, providing it also with a protective coating removable by exposure to aqueous media at the time of use.

The coatings comprising fuel cell reaction components will be suitably applied to the tape so that in use, the tape base will be wetted by an aqueous solution of electrolyte, fuel will be provided on one face of the base at the anode and in contact with the electrolyte solution, and oxidant will be provided on the opposite face, contacting the cathode, and in contact with the electrolyte solution. Thus for example, the tape may be provided with a plurality of coatings, such as a face of magnesium on a paper base coated on the opposite face with a first layer of dry ammonium bromide and a second layer upon this of microcapsules comprising dinitrobenzene and water, disposed so that pressure ruptures the capsules permitting the solution to wet the ammonium bromide, which then soaks into the paper base to provide an aqueous solution of ammonium bromide wetting the magnesium face. Separate layers, however, will often not be essential: for example, the electrolyte and fuel may usually be mixed in a single layer, and so forth.

A variety of flexible, fluid-impermeable materials can be used to encase the tape electrochemical systems. By impermeable is meant relative impermeability: for example, a water vapor permeability of 0.01–0.1 g.-mm./24 hours in.$^2$-cm. Hg at 25° C. for a 2–5 mil thick film may be acceptable. Thermoplastic polymer films are usually advantageous, because they can be heat-sealed, both to close the casing around the tape and to segment the tape into sections. Illustrative useful polymers include polyethylene, polytetrafluoroethylene, polytrichloroethylene, polyvinylidene chloride, polyvinyl chloride and their copolymers. The casing can be formed in part of metal foil if desired, as explained above. Provision must be made for contact of the current collectors with the active electrode materials in the system, as by exposure of these, or conductive leads contacting them, outside the casing. Portions of the casing contacting both the anode and the cathode materials, or the leads contacting them, must be made of non-conductive materials such as polymer films; the remainder can be conductive or non-conductive.

While the configuration of the casing may vary, in general it will conform essentially to that of the encased electrochemical system comprising the tape separator carrying an encapsulated fluid electrochemical reaction component. Segmenting seals in the casing will be located so that each segment contains encapsulated fluid; the continuity between the tape electrochemical systems in each segment can be interrupted at the seals, or the seals can be made fluid-tight over the tape, as by heat-sealing across the tape with sufficient force to compress the separator sufficiently to make it nonabsorptive at the seal.

The fuel cells in which the separator tapes of the invention are employed may comprise any suitable current collectors as the material leading to the point where the electrodes are placed in electrical contact through the tape separator. Suitable current collector and electrode materials include conductive carbon and copper, noble metals such as platinum, palladium, iridium, rhodium and the like, transition metals such as nickel, and so forth. These materials may be used in sheet form or in the form of screens, meshes or other types of porous bodies, and as elongated surfaces, bands, rollers, rings, or like configurations.

As will be apparent from the foregoing discussion, any of a wide variety of fuels, electrolytes and oxidants may be employed in fuel cells embodying a mobile tape separator in accordance with this invention. Descriptions of useful fuel cell reaction components are extensively available in published literature.

The fuel, for example, is sometimes a metal, and in this connection, metals which may be employed as consumable anodes include for example the alkali metals such as lithium, sodium, potassium, Group I–A metals such as copper and silver, Group II metals such as magnesium calcium, strontium, zinc and cadmium, Group III metals such as aluminum, Group IV metals such as tin, and so forth. The metals may be used individually or in mixtures such as the amalgam of sodium with mercury and the like. Gaseous reductants include for example hydrogen, natural and manufactured gas, light hydrocarbons such as propane and butane, inorganic gases such as ammonia, and so forth. Liquid and solid organic and inorganic fuels, including compounds such as methanol formaldehyde, formic acid, hydrazine, urea, guanidine and the like, generally have the advantage of being relatively cheap and easy to handle, more reactive than hydrocarbons, and soluble in the electrolyte solution, and form an especially preferred class for convenient utilization.

On the oxidant side, air and oxygen are among the most generally studied gaseous anode feed materials. Oxygen carriers such as hydrogen peroxide and various oxides and oxy acids (reducible compounds having one or more oxygen atoms, including peroxides) are also useful. Exemplary of such acids are nitric, sulfuric and persulfuric acids. Illustrative of inorganic oxides which may be employed are gases like $NO_2$ and $SO_2$, and salts such as sodium peroxide, potassium peroxide, vanadium pentoxide manganese dioxide, and the like. Also included in this group are salts of oxy acids such as sodium, potassium, lithium, barium, magnesium or calcium chromates, perchlorates, permanganates, and the like. Organic oxidants can also be employed as oxygen carriers for the cathode feed and in this connection, advantageous because of the high electron exchange number involved in their reduction are nitro compounds such as nitrobenzene, meta-dinitrobenzene, 2-chloro-5-nitropyridine, 4-nitropyridine-N-oxide, 8-nitroquinoline, p-nitrophenol, tetranitromethane and the like, as well as nitroso compounds such as p-nitrosodiethylaniline, sodium p-nitrosophenolate and the like. Halogens and halogenated compounds can also be used instead of oxygen-carrying compounds, as cathode feed materials. These may be gaseous halogens, such as bromine, fluorine and so forth, or organically bound halogen, as provided by compounds such as N,N'-dibromodimethylhydantoin, N,N' - dichlorodimethylhydantoin, N,N - dichloro - p - toluenesulfonamide, 2-chloronitropropane, and the like.

Electrolytic connection between the anode and cathode of fuel cells operating at relatively low temperatures such as about 100° C. or below is generally provided by an aqueous solution of an ionizing compound, which may be basic, such as 40% KOH, or acidic, such as 7 molar sulfuric acid, or neutral, such as 1 molar sodium sulfate, 2 molar ammonium or magnesium bromide and the like. Sometimes a solution is both reactant and electrolyte, as is the case for example with aqueous nitric acid used as an oxidant. The electrolyte solvent may be an ionizing liquid other than an aqueous solution, such as liquid ammonia or salt fluxes, or an organic solvent such as methyl formate, dimethylformamide, methanol, acrylonitrile or the like.

While the invention has been described with reference to various particular preferred embodiments thereof, it is to be understood that variations and modifications can be made without departing from the scope of the present invention, which is limited only as defined in the following claims.

What is claimed is:

1. The method of operating a dry tape fuel cell which comprises
   advancing a tape of electrolytically permeable material carrying a flexibly rupturably encapsulated fluid electrochemical reaction component
   and carrying fuel, oxidant, electrolyte and active electrode materials,
   encased in a flexible, fluid-impermeable casing, to active electrode sites between current collectors, and rupturing the encapsulation to release the fluid as the tape is fed to the active electrode sites.

2. The method of claim 1, in which individually encased short tape segments are sequentially fed between the current collectors.

3. The method of claim 2, in which the individually encased short tape segments are fed between the current collectors at a rate maintaining a substantially invariant power output during current drain.

4. The method of claim 1, in which an encased tape separator carrying a series of rupturable capsules along the length of the tape and substantially longer than the active electrode sites is fed between the current collectors.

5. The method of claim 4 in which the encased tape feed is divided into segments by fluid-impermeable seals across the casing.

6. A dry tape fuel cell feed comprising a tape of electrolytically permeable separator material, said tape being coated by electrochemical reaction components consisting essentially of an anode material, a fuel, an oxidant and a cathode material, at least one of said components being encapsulated in rupturable capsules contacting said tape.

7. The dry tape of claim 6, wherein said anode material and fuel are a consumable anode metal, said oxidant is a cathode depolarizer, said active mathode material is conductive carbon, and the encapsulated fluid component of the tape comprises the liquid component of an electrolyte.

8. The dry tape of claim 6, wherein the encapsulated fluid is water, and the tape carries an electrolyte solute.

9. The dry tape of claim 6, wherein said capsules are macrocapsules.

10. The dry tape of claim 6, wherein said capsules are microcapsules.

11. An encased dry tape fuel cell feed comprising an elongated tape of electrolytically permeable material carrying a fluid electrochemical reaction component in rupturable capsules and carrying fuel, oxidant, electrolyte and active electrode materials along its length, encased in a flexible, fluid-impervious casing.

12. The encased dry tape fuel cell feed of claim 11, in which the encased tape feed is divided into segments by fluid-impermeable seals across the casing.

13. The encased dry tape of claim 12, wherein the encapsulated fluid electrochemical reaction component is water.

14. An encased dry tape fuel cell feed comprising an elongated tape of electrolytically permeable material laminated to a consumable anode metal foil, coated on its other side with an oxidant, electrolyte solute and active electrode material, carrying electrolyte solvent encapsulated in rupturable capsules along its length, enclosed in a flexible, fluid-impermeable casing.

15. The encased dry tape fuel cell feed of claim 14 in which the encased tape feed is divided into segments by fluid-impermeable seals across the casing.

References Cited

UNITED STATES PATENTS

| | | | |
|---|---|---|---|
| 2,970,180 | 1/1961 | Urry | 136—153 X |
| 3,016,308 | 1/1962 | Macaulay | 117—36.7 |
| 3,079,454 | 2/1963 | McGinnis | 136—153 |
| 3,260,620 | 7/1966 | Gruber | 136—6 |

WINSTON A. DOUGLAS, *Primary Examiner.*

A. SKAPARS, *Assistant Examiner.*

U.S. Cl. X.R.

136—6, 83, 90, 114